Feb. 25, 1936.    F. C. SCHOCH    2,031,738
MAGNETICALLY RELEASABLE LATCH
Filed Oct. 29, 1934
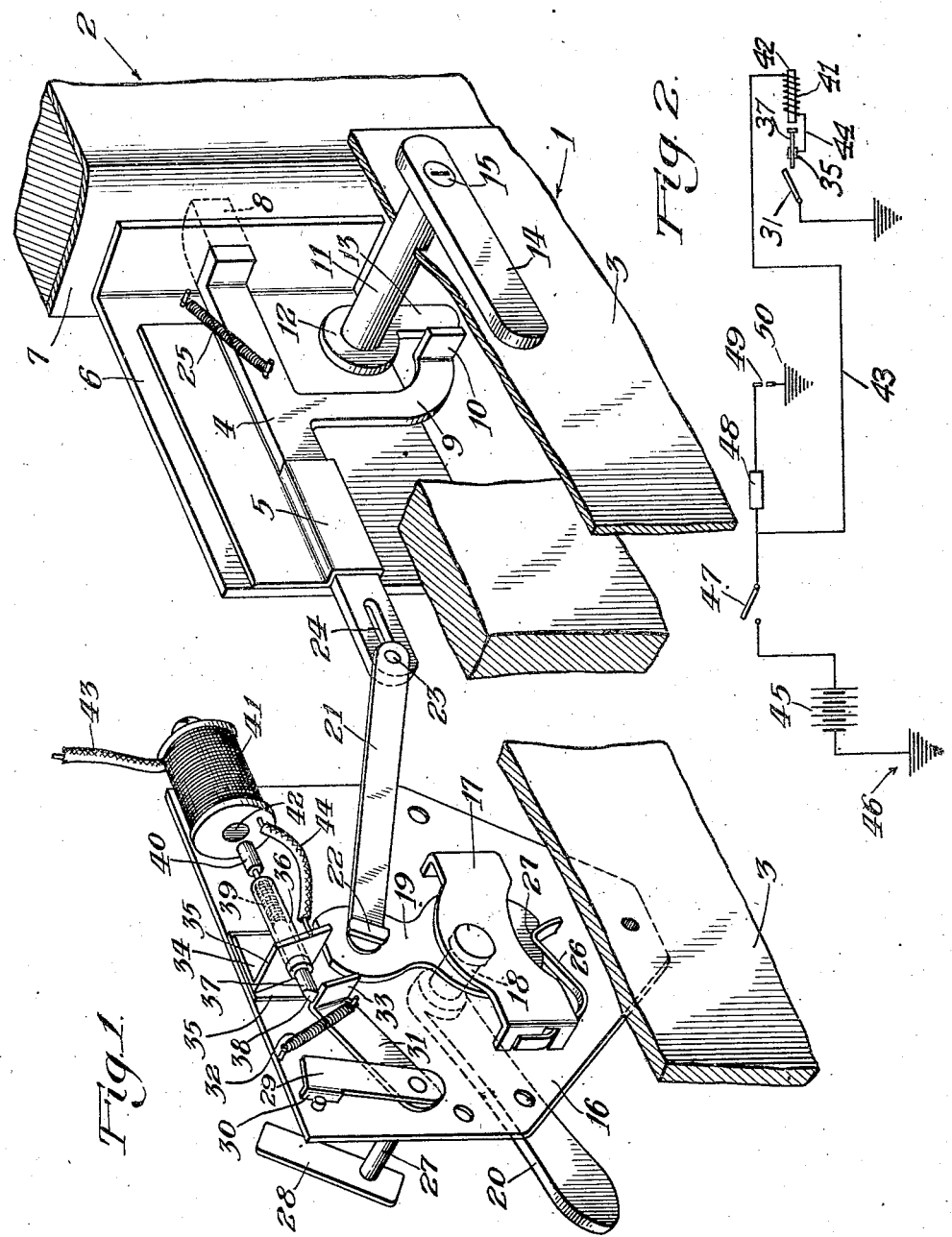
Inventor:
Fred C. Schoch,
By: Lee J. Gay
Attorney Patented Feb. 25, 1936

2,031,738

UNITED STATES PATENT OFFICE 2,031,738

MAGNETICALLY RELEASABLE LATCH

Fred C. Schoch, Oak Park, Ill.

Application October 29, 1934, Serial No. 750,447

5 Claims. (Cl. 70—50)

This invention relates to improvement in latch constructions for doors, windows and other closures and refers specifically to a magnetically releasable latch for automobile doors or the like.

It frequently happens particularly in the case of automobiles, that valuables, packages or the like are locked in the car. A thief, possibly not interested in the theft of the automobile itself, or frustrated in his attempt to steal the car, may appropriate the valuables or packages within the car by merely breaking a window, inserting his hand through the broken window to manipulate the inside latch handle, and thus open the door.

In my invention means is provided whereby the inside latch handles of all of the doors of the car may be rendered inoperative to open said doors while the car ignition system is turned off. Hence, a thief breaking the glass of such a door must enter and leave the car through the broken window. As a matter of human psychology, a wary thief is disinclined to enter a compartment from which he cannot quickly leave in the event of his detection. Consequently, inasmuch as the automobile thief, in the nature of things, ordinarily has only a relatively short time in which to perpetrate his pilfering and knowing that his operations may be suddenly detected, the miscreant will be reluctant to undergo the excessive risks he is compelled to take to steal from an automobile protected by my invention.

Another object of my invention resides in the economical construction of the automatically restrained latch and the ease with which the same may be applied to existing automobile door latches.

Other objects and advantages of my invention will be apparent from the accompanying drawing and following detail description.

In the drawing, Fig. 1 is a diagrammatic, perspective view of my magnetically controlled latch as applied to an automobile door, parts being eliminated for the sake of clarity.

Fig. 2 is a schematic wiring diagram of the mechanism shown in Fig. 1.

Referring in detail to the drawing, 1 indicates diagrammatically a portion of an automobile door mounted in the usual frame 2, only a portion of which is shown. Although my invention is illustrated and described in conjunction with an automobile door, in connection with which it is particularly well suited, it may also be used in conjunction with other closures such as windows, house doors and the like.

The reference numeral 3 indicates fragmentary portions of the outside panel of the automobile door 1, and positioned within said door and behind the panel 3 is a conventional type latch bolt 4 mounted in guide 5 which, in turn, may be disposed upon plate 6. A recess or keeper may be provided in the face plate 7 of frame 2, said keeper being adapted to receive the projecting end 8 of latch bolt 4.

An arm 9 may comprise an integral portion of latch bolt 4 and may extend downwardly from said latch bolt, said arm being provided with a contact lug 10 at its extremity. A shank 11 may be transversely positioned within door 1 and may carry a collar 12 at its innermost end. Arm 13 may comprise an integral portion of collar 12 and as will be hereinafter more fully described, said arm, upon rotation of shank 11, is adapted to contact lug 10 and thus shift latch bolt 4 so as to retract the end 8 of said latch from the keeper. The outer end of shank 11 may project outwardly from panel 3 and may carry a handle 14.

My present invention may be utilized in conjunction with the usual automobile door latch operating mechanism wherein a lock (not shown) is carried by shank 11, which may be operated by a key inserted in the key hole 15 provided at the outer end of said shank. However, it is to be understood that my present invention may be utilized with other types of latch operating devices, for instance, such as that shown in my co-pending application, Serial No. 746,666, filed October 3, 1934.

A plate 16 may also be positioned within door 1, said plate carrying upon its inner surface a bridge-like supporting member 17. A pin 18 may be journalled in both the members 17 and in plate 16 and may carry an arm 19 which is rigidly attached to said pin, said arm being positioned between member 17 and plate 16. A handle 20 may be secured to the opposite end of pin 18, said handle being positioned on the outer side of the inner panel (not shown) of the door 1. A link 21 may be pivotally connected as at 22 to arm 19, the opposite end of said link being pivotally connected to the end of latch bolt 4 as at 23. The connection between link 21 and latch bolt 4 is of the "lost-motion" type wherein a slot 24 is provided in the end of latch bolt 4 which may permit the independent operation of handle 14 in retracting latch bolt 4 without disturbing the remaining mechanism associated with link 21.

In normal operation latch bolt 4 may either be shifted to remove the end 8 thereof from the keeper by means of handle 14, or said latch bolt may be shifted by means of handle 20 from within the automobile. A spring 25 connected to plate 6 and latch bolt 4 may normally urge latch bolt 4 to closed position within the keeper, and a blade spring 26 mounted at one end upon member 17 and engageable at the other end with an indented portion 27 of the element 19, may serve to return arm 19 and handle 20 to its original position when handle 20 has been manipulated to retract latch bolt 4.

A pin 27 may be transversely journalled in plate 16, the outer end of said pin carrying handle 28 which may be operable from the inside of the automobile. The opposite end of pin 27 may carry arm 29 which may be rigidly secured to said pin. The end of arm 29 may carry an offset lug 30, the function of which will be hereinafter described. A second arm 31 may be loosely mounted at one end upon pin 27 between arm 29 and plate 16. A coil spring 32 is connected between arm 31 and plate 16 in such a manner as to urge arm 31 in a counter clockwise direction as viewed in Fig. 1. End 33 of arm 31 may be bent at right angles to said arm and when said arm is in the position shown in Fig. 1, the end 33 thereof is disposed adjacent arm 19.

A lug 34 may be secured to plate 16 but may be electrically insulated by insulator 35 from said plate, it being understood that plate 16 and lug 34 are of metallic construction wherein insulator 35 may comprise fiber, hard rubber, Bakelite or the like. Lug 34 may be bent intermediate its length so as to provide an outwardly extending bracket 35 which may project at an angle to the face of plate 16. A metallic sleeve 36 may be secured to the projecting lug 35 and may be disposed at an angle to the member 35 and substantially parallel to the plane of plate 16. A pin 37 having a bevel end 38 may be slidably positioned within sleeve 36 and a coil spring 39 may be positioned within sleeve 36 and may be so operatively associated with pin 37 as to normally urge said pin toward the left as viewed in Fig. 1.

The opposite end of pin 37 may comprise button 40 which may be made of steel or iron or any other magnetic material. A solenoid 41 may be mounted upon plate 16 and the wires constituting the same may be wound around the core 42 constructed of magnetic material. The disposition of solenoid 41 is so arranged with respect to pin 37 as to position core 42 and pin 37 coaxial, the movement of pin 37 being in a line with the longitudinal axis of core 42.

In operation, when the door 1 is in normal closed position as indicated in Fig. 1, latch bolt 4, arm 19, handle 20 and pin 37 will be in the position shown in the drawing.

Arm 31 in its normal position, that is, its unlocked position, will be rotated to its extreme counterclockwise position by spring 32. In other words, the bent end 33 of arm 31 will be above the bevelled end of pin 37. When it is desired to lock the mechanism so that latch bolt 4 cannot be retracted by handle 20, handle 28 may be rotated in a clockwise direction. This rotation, of course, is imparted to arm 29 and the offset lug 30 carried by said arm contacts the upper edge of arm 31. As handle 28 is rotated to the right or in a clockwise direction, arm 29 carries arm 31 in the same direction and the lower edge of the bent end 33 of arm 31 contacts the bevel 38 and forces pin 37 to the right against the compression of spring 39.

When arm 28 has been so rotated as to bring the upper edge of the bent end 33 below pin 37, said pin, under the influence of spring 39 moves to the left and above the bent end 33 preventing counterclockwise movement of arm 31. It can readily be seen that as handle 28 has moved arm 31 to this position, said handle is rendered inoperative to further control arm 31. When arm 31 is in this position the bent end 33 of said arm is disposed adjacent the end of arm 19 and, consequently, movement of said arm in a counterclockwise direction is prevented thereby rendering handle 20 inoperative in so far as its function of retracting latch bolt 4 is concerned.

The coil of solenoid 41 may be connected to the ignition switch of the automobile by means of lead 43. The opposite end of said coil may be connected by means of conductor 44 to plate 35, which as has been hereinbefore described, is insulated from plate 16.

Referring particularly to Fig. 2, a schematic drawing of the wiring system is shown wherein 45 indicates the storage battery or source of electricity for the automobile. The negative end of said battery may be grounded as shown at 46. The positive side of the battery may be connected through switch 47 to the spark coil and distributor indicated diagrammatically at 48.

The high tension side of the distributor may connect to the spark plugs of the automobile indicated diagrammatically at 49. Of course, the opposite sides of the spark plugs are grounded as shown at 50. Conductor 43 may connect that side of ignition switch 47 which is opposite to the battery 45 to coil or solenoid 41. The opposite side of coil 41 may be connected by conductor 44 to lug 35.

In operation, when handle 20 is rendered inoperative in so far as the retracting of latch bolt 4 is concerned, arm 31 will be in the position shown in Fig. 1 and the bent portion 33 of said arm is held against counterclockwise rotation by means of the end of pin 37. Consequently, the bent portion 33 and the end of pin 37 are in contact. Hence, when the ignition switch 47 is closed, a circuit may be traced from battery 45 through switch 47, conductor 43, coil 41, conductor 44, member 37, member 31 and the ground, thereby providing a complete circuit through coil 41. When coil 41 is thus energized its magnetic core 42 is energized or magnetized, and member 37 being disposed adjacent the end of said core is magnetically attracted.

It can readily be seen by reference to Fig. 1, that when button 40 is attracted by core 42, pin 37 will move to the right against the compression of spring 39. In so moving the end 38 of said pin is removed as an obstruction to the bent portion 33 of arm 31 and, acting under the influence of spring 32, said arm is moved in a counterclockwise direction. When the arm 31 so moves arm 19 will be free to move in a counterclockwise direction when force is applied to handle 20 thereby permitting latch bolt 4 to be retracted from the keeper. Of course, when arm 31 moves the limit of its counterclockwise motion, under the impulse of spring 32, the bent portion 33 of said arm breaks contact with the end of pin 37 and, hence, the circuit through coil 52 is broken, core 42 is demagnetized, and pin 37 acting under the influence of spring 39, moves to the left to its normal position.

It can readily be seen, therefore, that when the handle 28 of door 1 is rotated in a clockwise direction after the ignition has been shut off, the door cannot be unlocked except through the agency and use of a key to permit the rotation of handle 14. When the driver desires to enter the car, lock 15 is properly manipulated to permit the rotation of handle 14 and latch bolt 4 may thereby be retracted. After entrance into the car the ignition may be turned on which action completes the electrical circuit through solenoid 41 as has been hereinbefore described and releases arm 31 from the position shown in Fig. 1.

It is to be understood, of course, that the remaining doors of the automobile may all be provided with the same type magnetically operated latch mechanism and that the various leads corresponding to lead 43 may all be connected to a common source adjacent the ignition switch 47. Hence, after all of the handles 28 have been so set as to rotate arm 31 to its locking position, all of the arms corresponding to arm 31 may be simultaneously released by turning on the ignition inasmuch as all of the coils corresponding to solenoid 41 are connected in parallel.

The mechanism constituting the latching instrumentalities illustrated and described in Figs. 1 and 2, of course, will be duplicated in all of the doors. However, in view of the fact that but one of the doors is to be key operated, only one of said doors may be provided with a key operated lock and only one of the latch bolts corresponding to latch bolt 4 will have a lost motion connection with the links corresponding to link 21, since, there should be no occasion to have the outside door handles of the remaining doors of the car independently operable with respect to the inside handles.

I claim as my invention:

1. In a device of the class described, the combination of a slidable automobile door latch bolt with means for moving said latch bolt from latching position, comprising a handle operated arm operatively connected to said latch bolt, means for restraining movement of said arm comprising a spring operated swingable lug, means for manually disposing said lug adjacent said arm, and magnetic means for releasing said lug whereby said lug acting under the influence of said spring swings from its position adjacent said arm.

2. In a device of the class described, the combination of a slidable automobile door latch bolt with means for moving said latch bolt from latching position, comprising a handle operated arm operatively connected to said latch bolt, means for restraining movement of said arm comprising a spring operated swingable lug disposed adjacent said arm, and magnetic means for releasing said lug whereby said lug acting under the influence of said spring swings from its position adjacent said arm, said magnetic means comprising a solenoid connected with a source of electric current, a spring urged plunger disposed adjacent the core of said solenoid, said plunger being normally urged by its associated spring to a position to prevent movement of said lug in response to its associated spring.

3. In a device of the class described, the combination of a slidable automobile door latch bolt with means for moving said latch bolt from latching position, comprising a handle operated arm operatively connected to said latch bolt, means for restraining movement of said arm comprising a spring operated swingable lug disposed adjacent said arm, and magnetic means for releasing said lug whereby said lug acting under the influence of said spring swings from its position adjacent said arm, said magnetic means comprising a solenoid connected to the ungrounded side of a source of electric current, an ungrounded spring urged plunger disposed adjacent the core of said solenoid, said plunger being normally urged by its associated spring away from said core, said plunger making contact with said lug to prevent movement of said lug in response to its associated spring, said lug being grounded whereby said plunger is grounded when said lug is in restraining position, said plunger being connected to said solenoid whereby said solenoid is energized when the automobile ignition system is turned on.

4. In a device of the class described, the combination of a slidable automobile door latch bolt with means on the outside and means on the inside of said door for moving said latch bolt from latching position, said inside means comprising a handle operated arm operatively connected to said latch bolt, means for restraining movement of said arm comprising a spring operated swingable lug disposed adjacent said arm, and magnetic means for releasing said lug whereby said lug acting under the influence of said spring swings from its position adjacent said arm.

5. In a device of the class described, the combination of a slidable automobile door latch bolt with means on the outside and means on the inside of said door for moving said latch bolt from latching position, said inside means comprising a handle operated arm operatively connected to said latch bolt through a lost motion connection whereby said outside and inside latch bolt moving means operate independently, means for restraining movement of said arm comprising a spring operated swingable lug disposed adjacent said arm, and magnetic means for releasing said lug whereby said lug acting under the influence of said spring swings from its position adjacent said arm.

FRED C. SCHOCH.